United States Patent
Komori et al.

(10) Patent No.: US 10,759,359 B1
(45) Date of Patent: Sep. 1, 2020

(54) HOLDING STRUCTURE FOR CABLE

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Hirokazu Komori, Yokkaichi (JP); Yoshinori Sadahiro, Yokkaichi (JP); Hideki Hattori, Yokkaichi (JP)

(73) Assignees: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka-Shi, Osaka (JP)

( * ) Notice: Subject to any disclaimer, the term of this patent is extended or adjusted under 35 U.S.C. 154(b) by 316 days.

(21) Appl. No.: 16/061,485

(22) PCT Filed: Dec. 2, 2016

(86) PCT No.: PCT/JP2016/085884
§ 371 (c)(1),
(2) Date: Jun. 12, 2018

(87) PCT Pub. No.: WO2017/110423
PCT Pub. Date: Jun. 29, 2017

(30) Foreign Application Priority Data

Dec. 22, 2015 (JP) ................................. 2015-249633

(51) Int. Cl.
*B60R 16/02* (2006.01)
*H02G 3/32* (2006.01)
(Continued)

(52) U.S. Cl.
CPC ....... *B60R 16/0215* (2013.01); *H01B 7/0045* (2013.01); *H02G 3/32* (2013.01); *H02G 15/013* (2013.01); *H01R 2201/26* (2013.01)

(58) Field of Classification Search
CPC .................................................. B60R 16/0215
See application file for complete search history.

(56) References Cited

U.S. PATENT DOCUMENTS 4,288,107 A * 9/1981 Schwartze ............. F16L 47/22
285/123.2
5,714,715 A * 2/1998 Sundhararajan ..... H02G 15/046
174/20
(Continued)

OTHER PUBLICATIONS

International Search Report for Application No. PCT/JP2016/085884 dated Dec. 27, 2016; 4 pages.

*Primary Examiner* — Ross N Gushi
(74) *Attorney, Agent, or Firm* — Reising Ethington, P.C.

(57) ABSTRACT

A holding structure for a cable includes a cable in which electrical wires extend out from an end portion of a sheath, a first holder provided with a first clamping portion, a second holder provided with a second clamping portion configured to clamp the cable between the first clamping portion and the second clamping portion, a rubber plug that has a plurality of through-holes through which the electrical wires respectively are passed, and that is held by the first holder and the second holder, in a state in which the rubber plug is fitted around the end portion of the sheath, and a binding member that is wrapped around the first clamping portion and the second clamping portion.

4 Claims, 10 Drawing Sheets

(51) Int. Cl.
*H02G 15/013* (2006.01)
*H01B 7/00* (2006.01)

(56) References Cited

U.S. PATENT DOCUMENTS

| | | | | |
|---|---|---|---|---|
| 7,635,813 | B2* | 12/2009 | Taylor | H02G 15/24 |
| | | | | 174/74 R |
| 9,673,605 | B2* | 6/2017 | Cairns | H02G 15/046 |
| 9,842,671 | B2* | 12/2017 | Komori | H01B 7/282 |
| 10,003,141 | B2* | 6/2018 | Komori | H01R 4/70 |
| 10,148,078 | B2* | 12/2018 | Komori | H02G 15/04 |
| 10,236,671 | B2* | 3/2019 | Komori | H01B 7/282 |
| 10,298,004 | B2* | 5/2019 | Komori | H02G 15/013 |
| 10,355,469 | B2* | 7/2019 | Komori | H02G 15/046 |
| 10,399,515 | B2* | 9/2019 | Shimizu | H02G 3/0406 |
| 10,576,915 | B2* | 3/2020 | Shimizu | H01B 7/282 |
| 10,647,271 | B2* | 5/2020 | Toyoshima | H02G 3/32 |
| 2004/0154817 | A1 | 8/2004 | Sudo et al. | |
| 2013/0105219 | A1 | 5/2013 | Osawa et al. | |
| 2015/0107894 | A1 | 4/2015 | Hayashi et al. | |
| 2018/0041020 | A1* | 2/2018 | Komori | H01B 7/282 |
| 2018/0109097 | A1* | 4/2018 | Komori | H02G 15/013 |
| 2018/0366934 | A1* | 12/2018 | Komori | B60R 16/0222 |
| 2019/0006834 | A1* | 1/2019 | Komori | H02G 15/013 |
| 2019/0288445 | A1* | 9/2019 | Komori | H01R 13/5837 |

* cited by examiner

HOLDING STRUCTURE FOR CABLE

CROSS REFERENCE TO RELATED APPLICATIONS

This application claims the priority of Japanese patent application JP2015-249633 filed on Dec. 22, 2015, the entire contents of which are incorporated herein.

TECHNICAL FIELD

The present invention relates to a holding structure for a cable.

BACKGROUND ART

Conventionally, a waterproof structure as disclosed in JP 2003-17476A (Patent Document 1) is known as a structure for waterproofing terminal portions of a multicore cable. In this structure, a tubular member is fitted around a front end of a sheath of the multicore cable from which a plurality of electrical wires are drawn out, and this tubular member is filled with a sealing material such as a silicone-based adhesive.

In the above-described multicore cable, first, the front end of a nozzle is inserted into a gap between the sheath and the tubular member, and a sealing material is injected from the front end of the nozzle, the front end of the nozzle is then inserted between a plurality of electrical wires, and the sealing material is injected from the front end of this nozzle between the plurality of electrical wires. Accordingly, the electrical wires and the sheath are sealed, and the electrical wires are sealed.

SUMMARY

However, the above-described configuration was problematic in that it took time for performing the process of filling the tubular member with the sealing material.

In view of this, a structure in which a rubber plug provided with insertion holes for passage of a plurality of electrical wires is fitted around an end portion of a sheath of a multicore cable was thought as a hypothetical technique.

However, according to the above-described configuration, in order to keep the waterproofness of the electrical wires using the rubber plug that is fitted around the end portion of the sheath, it is necessary to suppress shifting of positions of the sheath and the plurality of electrical wires. This is because if the sheath and the plurality of electrical wires are positionally shifted, there is a concern that the relative positions of the insertion holes formed through the rubber plug and the plurality of electrical wires will shift.

The technology disclosed in the present specification was achieved in light of the above-described situation, and an object thereof is to hold electrical wires and a sheath in a state in which shifting of the positions of the electrical wires and the sheath is suppressed.

The technology disclosed in the present specification is a holding structure for a cable, the structure including a cable in which a plurality of electrical wires are enveloped by a sheath, the plurality of electrical wires extending out from an end portion of the sheath; a first holder provided with a first clamping portion configured to clamp the cable between the first clamping portion and a second clamping portion; a second holder provided with the second clamping portion configured to clamp the cable between the first clamping portion and the second clamping portion in a state in which the second holder is attached to the first holder; a rubber plug that has a plurality of through-holes through which the plurality of electrical wires respectively are passed, and that is held by the first holder and the second holder, in a state in which the rubber plug is fitted around the end portion of the sheath; and a binding member that is wrapped around the first clamping portion and the second clamping portion in a state in which the cable is clamped between the first clamping portion and the second clamping portion.

According to the above-described configuration, when the cable is clamped between the first clamping portion and the second clamping portion, a force is applied from the first clamping portion and the second clamping portion to the cable in a direction in which the sheath is clamped. Accordingly, an inner circumferential surface of the sheath and outer surfaces of the electrical wires come into intimate contact with each other, and thus shifting of the positions of the sheath and the electrical wires can be suppressed.

Next, the first clamping portion and the second clamping portion receive a force in a radial direction from the binding member that is wrapped around the first clamping portion and the second clamping portion in a state in which the cable is clamped between the first clamping portion and the second clamping portion. Accordingly, a force is applied to the sheath in a direction in which the diameter of the sheath is reduced inward in the radial direction of the sheath. As a result, the inner circumferential surface of the sheath and the outer surfaces of the electrical wires are intimate contact with each other, and thus the sheath and the electrical wires are reliably fixed.

As a result of the above, shifting of the positions of the sheath and the plurality of electrical wires is suppressed, and thus shifting of the positions of the plurality of through-holes formed through the rubber plug and the plurality of electrical wires is also suppressed. On the other hand, shifting of the positions of the rubber plug and the sheath is suppressed due to the rubber plug being fitted around the end portion of the sheath. As a result of the above, shifting of the relative positions of the rubber plug, the sheath, and the plurality of electrical wires is suppressed, and thus the plurality of electrical wires can be reliably sealed by the rubber plug.

The following aspects are preferable as embodiments of the present disclosure.

One of the first holder and the second holder may be provided with a locking portion, the other of the first holder and the second holder may be provided with a locking reception portion configured to elastically engage with the locking portion, the first holder may have a first linking portion configured to link the first clamping portion and one of the locking portion and the locking reception portion, and the second holder has a second linking portion configured to link the second clamping portion and the other of the locking portion and the locking reception portion.

According to the above-described configuration, when the locking portion and the locking reception portion elastically engage with each other, a force is applied thereto in a direction in which the locking portion and the locking reception portion approach each other. This force is transmitted from one of the locking portion and the locking reception portion to the first clamping portion via the first linking portion, and is transmitted from the other of the locking portion and the locking reception portion to the second clamping portion via the second linking portion. Accordingly, it is possible to reliably clamp the cable that is clamped between the first clamping portion and the second clamping portion, and to reliably suppress shifting of the positions of the sheath and the electrical wires.

The technology disclosed in the present specification can be suitably applied to a configuration in which the first clamping portion extends in a cantilever shape from an end portion of the first linking portion along the cable, and the second clamping portion extends in a cantilever shape from an end portion of the second linking portion along the cable.

According to the above-described configuration, when the sheath is clamped between the first clamping portion and the second clamping portion, a free end of the first clamping portion and a free end of the second clamping portion tend to rise outward in the radial direction of the cable due to a repulsive force applied from the sheath. The diameters of the free end of the first clamping portion and the free end of the second clamping portion can be reliably reduced inward in the radial direction of the sheath by fastening, with the binding member, portions that have risen from the sheath in this state. At this time, the first clamping portion is capable of further strongly supporting and holding the sheath due to the lever principle with the borderline portion to the first linking portion serving as a pivot. Similarly, the second clamping portion is capable of further strongly supporting and holding the sheath due to the lever principle with the borderline portion to the second linking portion serving as a pivot.

It is preferable that the holding structure for a cable includes a cap configured to press the rubber plug inward in a state in which the cap is fitted around the rubber plug, in which the cap is provided with an engagement reception portion configured to engage with an engagement portion that is formed in both or one of the first holder and the second holder in a state in which the cable is clamped between the first clamping portion and the second clamping portion.

According to the above-described configuration, the sheath is held by the first clamping portion and the second clamping portion, and the cap is held by an engagement groove and an engagement protrusion. Accordingly, the relative positions of the sheath and the cap can be reliably held. Accordingly, the rubber plug is reliably pressed against the sheath and the electrical wires by the cap. As a result, it is possible to reliably seal portions at which the electrical wires branch in the cable.

According to the technology disclosed in the present specification, it is possible to hold electrical wires and a sheath in a state in which shifting of the positions of the electrical wires and the sheath is suppressed.

DESCRIPTION OF EMBODIMENTS

Embodiment 1

Figure 1:
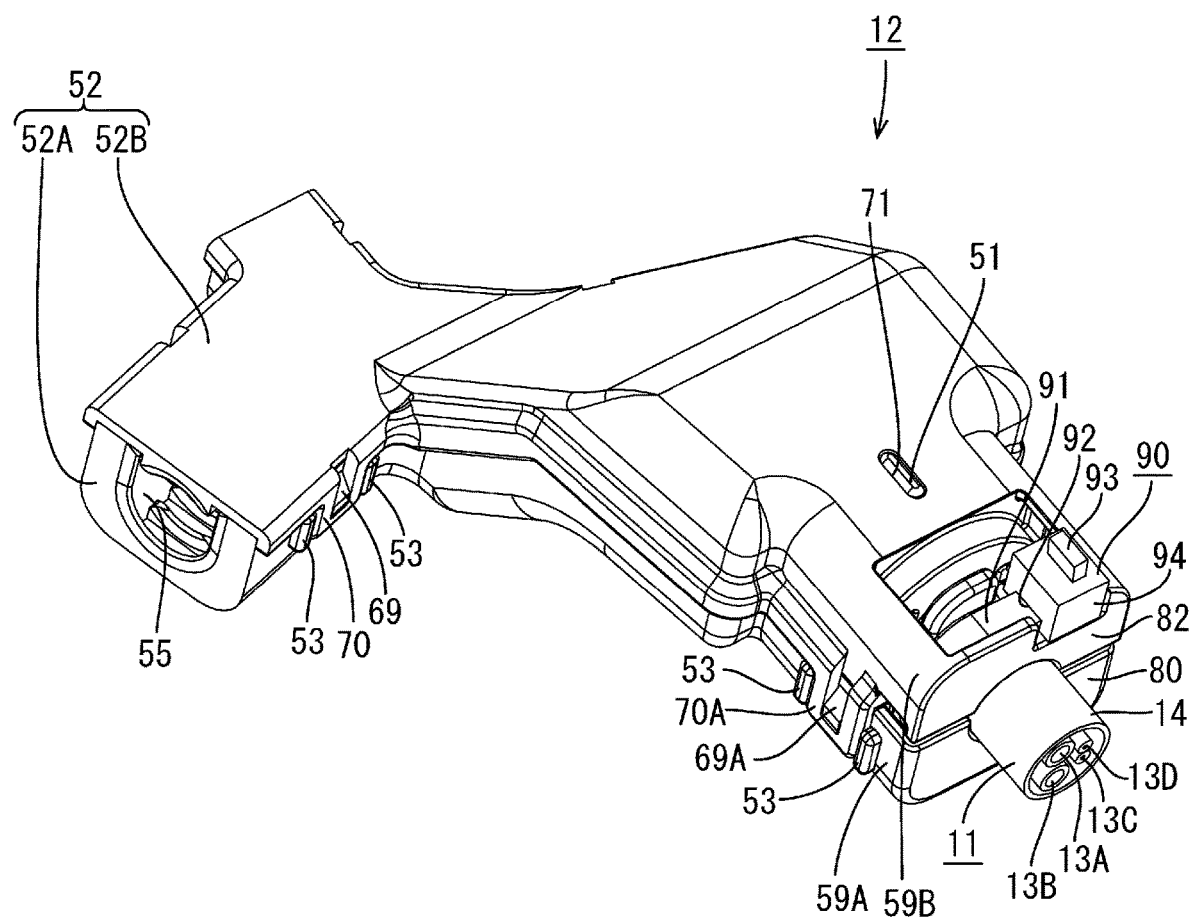
FIG. 1 is a perspective view showing a holding structure for a cable according to Embodiment 1.

Embodiment 1 to which the technology disclosed in this specification is applied to a holding structure 12 for a cable 11 will be described with reference to FIGS. 1 to 11. The present embodiment can be applied to a wire harness for an electrical parking brake that is installed in a vehicle (not shown), for example. As shown in FIG. 1, the holding structure 12 includes the cable 11 and a holder 52 configured to hold the cable 11. In the following description, "top" refers to the upper side in FIG. 2, and "bottom" refers to the lower side in FIG. 2. Note that the above-described directions are used for convenience of the description, and the holding structure 12 can be disposed in any orientation with respect to the vehicle.

The rubber plug 15 is fitted around an end portion 14A of the sheath 14 of the cable 11. The cap 17 is fitted around this rubber plug 15. The cable 11 and the cap 17 are held by the holder 52.

As shown in FIG. 1, the cable 11 according to the present embodiment has a configuration in which a plurality (four in the present embodiment) of electrical wires 13A, 13B, 13C, and 13D are enveloped by a sheath 14 that is made of an insulating synthetic resin. The electrical wires 13A, 13B, 13C, and 13D have a configuration in which the outer circumferential surface of a metal core wire (not shown) is covered by a synthetic resin insulating covering (not shown). The cable 11 has a circular cross-section.

The four electrical wires 13A, 13B, 13C, and 13D include two types of electrical wires 13A, 13B, 13C, and 13D that have different outer diameters. In the present embodiment, the first electrical wire 13A and the second electrical wire 13B are for connection to an electrical parking brake motor, and the third electrical wire 13C and the fourth electrical wire 13D are for a sensor. The first electrical wire 13A, the second electrical wire 13B, the third electrical wire 13C, and the fourth electrical wire 13D have circular cross-sections.

The outer diameters of the first electrical wire 13A and the second electrical wire 13B are set to be larger than the outer diameters of the third electrical wire 13C and the fourth electrical wire 13D. The outer diameter of the first electrical wire 13A is set to be the same as the outer diameter of the second electrical wire 13B. Also, the outer diameter of the third electrical wire 13C is set to be the same as the outer diameter of the fourth electrical wire 13D. The first electrical wire 13A, the second electrical wire 13B, the third electrical wire 13C, and the fourth electrical wire 13D extend and branch out from the end portion 14A of the sheath 14 of the cable 11.

Figure 5:
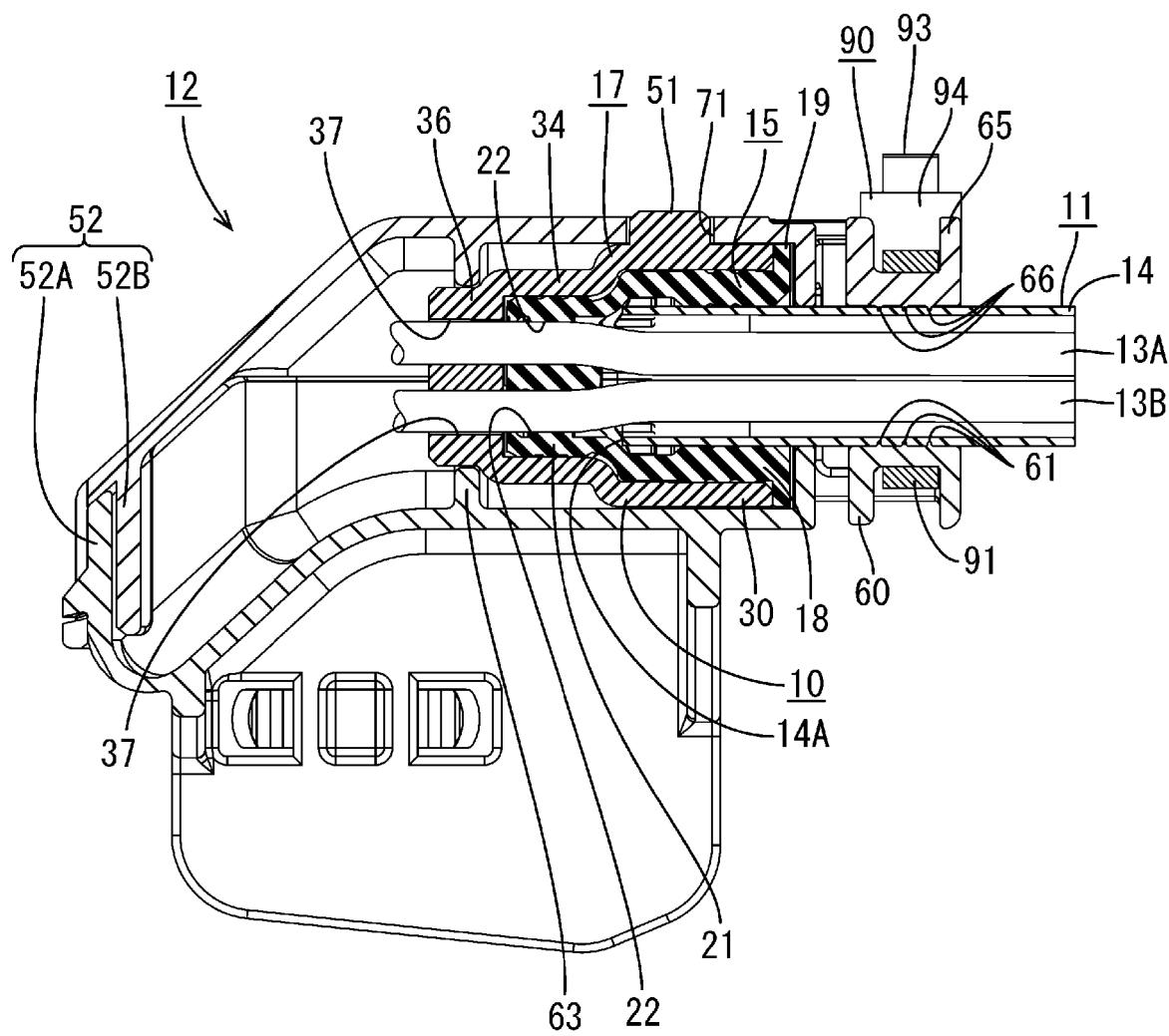
FIG. 5 is a cross-sectional view taken along line V-V in FIG. 3.

As shown in FIG. 5, the seal member 10 is attached to the end portion 14A of the sheath 14 of the cable 11, specifically to the region in which the first electrical wire 13A, the second electrical wire 13B, the third electrical wire 13C, and the fourth electrical wire 13D are branched. The intrusion of a liquid such as water or oil through the end portion 14A of the sheath 14 into the sheath 14 is suppressed by the seal member 10. The seal member 10 includes the rubber plug 15 that is fitted around the end portion 14A of the sheath 14, and the cap 17 that is fitted around the rubber plug 15.

As shown in FIG. 5, the rubber plug 15 is fitted around the end portion 14A of the sheath 14. The rubber plug 15 has a sheath fitting portion 18 that is fitted around the end portion 14A of the sheath 14. The sheath fitting portion 18 is shaped as a hood that extends toward the side opposite to the end portion 14A of the sheath 14 (right side in FIG. 5) and is open in a direction opposite to the end portion 14A of the sheath 14 (rightward in FIG. 5). A flange portion 19 that protrudes outward in the radial direction of the sheath fitting portion 18 is formed at an end edge portion of the sheath fitting portion 18. The sheath fitting portion 18 is shaped as a substantially circular tube in its natural state.

In the state where the sheath fitting portion 18 is fitted around the end portion 14A of the sheath 14, the inner circumferential surface of the sheath fitting portion 18 is in intimate contact with the outer circumferential surface of the sheath 14. This seals the rubber plug 15 and the sheath 14.

As shown in FIG. 5, an electrical wire through-hole portion 21 is provided at an end portion that is opposite to the sheath fitting portion 18 of the rubber plug 15, and the electrical wire through-hole portion 21 has a plurality (four in the present embodiment) of through-holes 22 for passage of the first electrical wire 13A, the second electrical wire 13B, the third electrical wire 13C, and the fourth electrical wire 13D respectively.

When the inner surfaces of the through-holes 22 are in intimate contact with the outer circumferential surfaces of the first to fourth electrical wires 13A, 13B, 13C, and 13D, the rubber plug 15 and the first to fourth electrical wires 13A, 13B, 13C, and 13D are sealed.

As shown in FIG. 5, the cap 17 made of a synthetic resin is fitted around the rubber plug 15. The cap 17 is fitted around the rubber plug 15 from the side (left side in FIG. 5) on which the first electrical wire 13A, the second electrical wire 13B, the third electrical wire 13C, and the fourth electrical wire 13D extend out from the end portion 14A of the sheath 14. The cap 17 is open toward the sheath 14 (rightward in FIG. 5) from the side from which the first electrical wire 13A, the second electrical wire 13B, the third electrical wire 13C, and the fourth electrical wire 13D extend out. The open end edge of the cap 17 is in contact with the flange portion 19 of the rubber plug 15.

The cap 17 is provided with a wide portion 30 that is fitted around the sheath fitting portion 18 of the rubber plug 15 at a position on the open end edge side (right side in FIG. 5) of the cap 17. The cross-sectional shape of the wide portion 30 is approximately circular and conforms to the outer shape of the sheath fitting portion 18. The inner circumferential surface of the wide portion 30 comes into intimate contact with the outer circumferential surface of the sheath fitting portion 18. Accordingly, the wide portion 30 of the cap 17 and the sheath fitting portion 18 of the rubber plug 15 are sealed.

In the state where the wide portion 30 of the cap 17 is fitted around the sheath fitting portion 18 of the rubber plug 15, the wide portion 30 presses the sheath fitting portion 18 inward in the radial direction of the sheath fitting portion 18. Accordingly, the sheath fitting portion 18 is pressed against the outer circumferential surface of the sheath 14 from the outside. Accordingly, the inner circumferential surface of the sheath fitting portion 18 reliably comes into intimate contact with the outer circumferential surface of the sheath 14.

As shown in FIG. 5, a narrow portion 34 that is fitted around the electrical wire through-hole portion 21 of the rubber plug 15 is provided at a position in the cap 17 that is opposite (left side in FIG. 5) to the direction in which the cap 17 is open relative to the wide portion 30. The outer diameter of the narrow portion 34 is set to be smaller than the outer diameter of the wide portion 30.

The inner circumferential surface of the narrow portion 34 is in intimate contact with the outer circumferential surface of the electrical wire through-hole portion 21. Accordingly, the narrow portion 34 of the cap 17 and the electrical wire through-hole portion 21 of the rubber plug 15 are sealed.

In the state where the narrow portion 34 of the cap 17 is fitted around the electrical wire through-hole portion 21 of the rubber plug 15, the narrow portion 34 presses the electrical wire through-hole portion 21 inward in the radial direction of the electrical wire through-hole portion 21. Accordingly, the electrical wire through-hole portion 21 is compressed from the outside. Accordingly, the inner circumferential surfaces of the through-holes 22 are reliably brought into intimate contact with the outer circumferential surfaces of the first to fourth electrical wires 13A, 13B, 13C, and 13D respectively.

The cap 17 is provided with a bottom wall 36 at a position (left side in FIG. 5) that is opposite to the direction in which the cap 17 is open. As shown in FIG. 5, lead-out holes 37 are formed in the bottom wall 36, passing through the bottom wall 36 such that the first electrical wire 13A, the second electrical wire 13B, the third electrical wire 13C, and the fourth electrical wire 13D respectively extend out from the cap 17.

Figure 7:
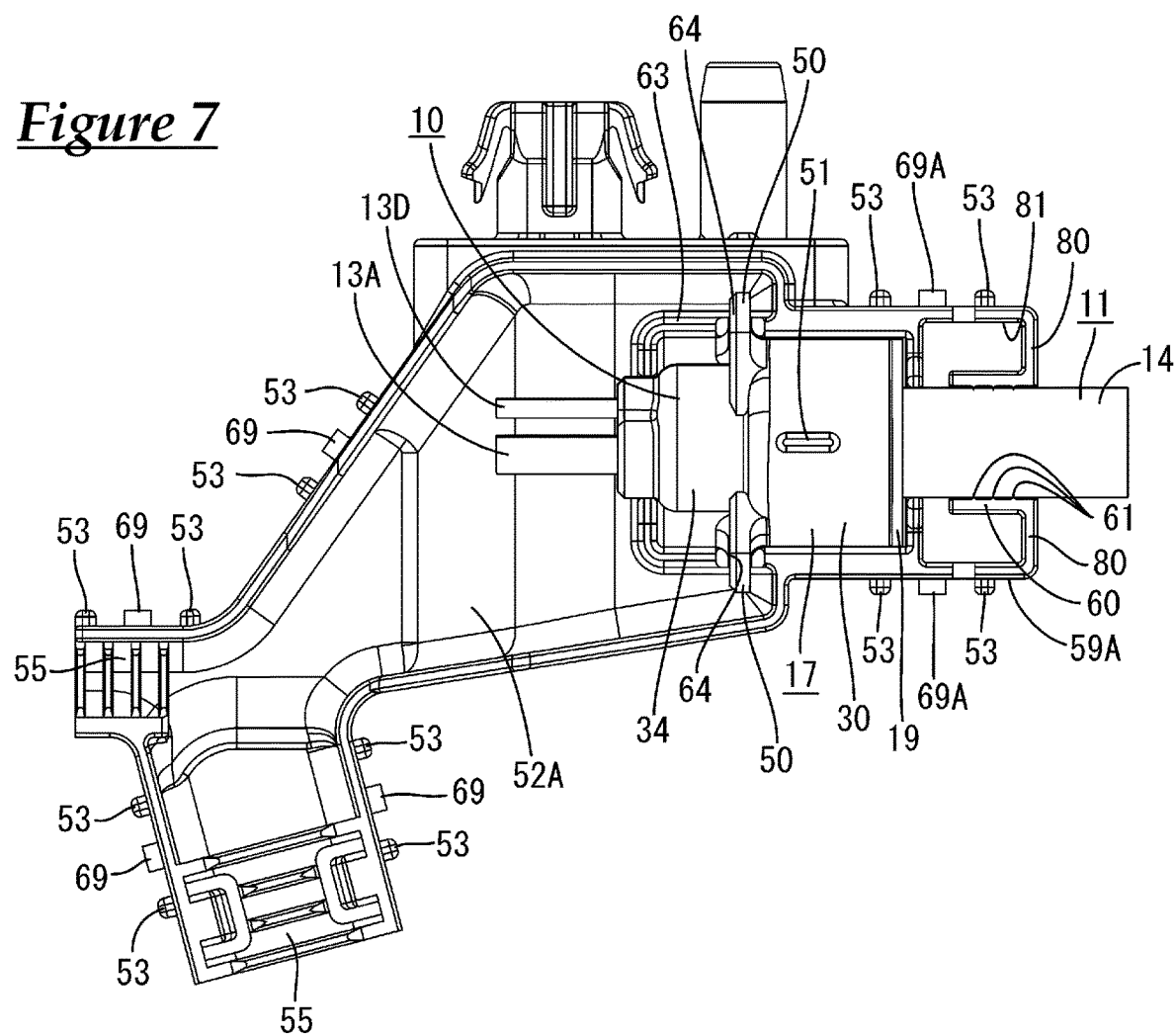
FIG. 7 is a plan view showing a state in which a cable to which a cap was attached is placed on the first holder.

As shown in FIG. 7, the cap 17 is provided with two engagement protrusions 50 (engagement reception portions) that protrude outward from the outer surface of the narrow portion 34 in the radial direction of the narrow portion 34. The two engagement protrusions 50 protrude in opposite directions. The two engagement protrusions 50 have a plate shape, and have an approximately rectangular shape as a whole (see FIG. 8).

Figure 8:
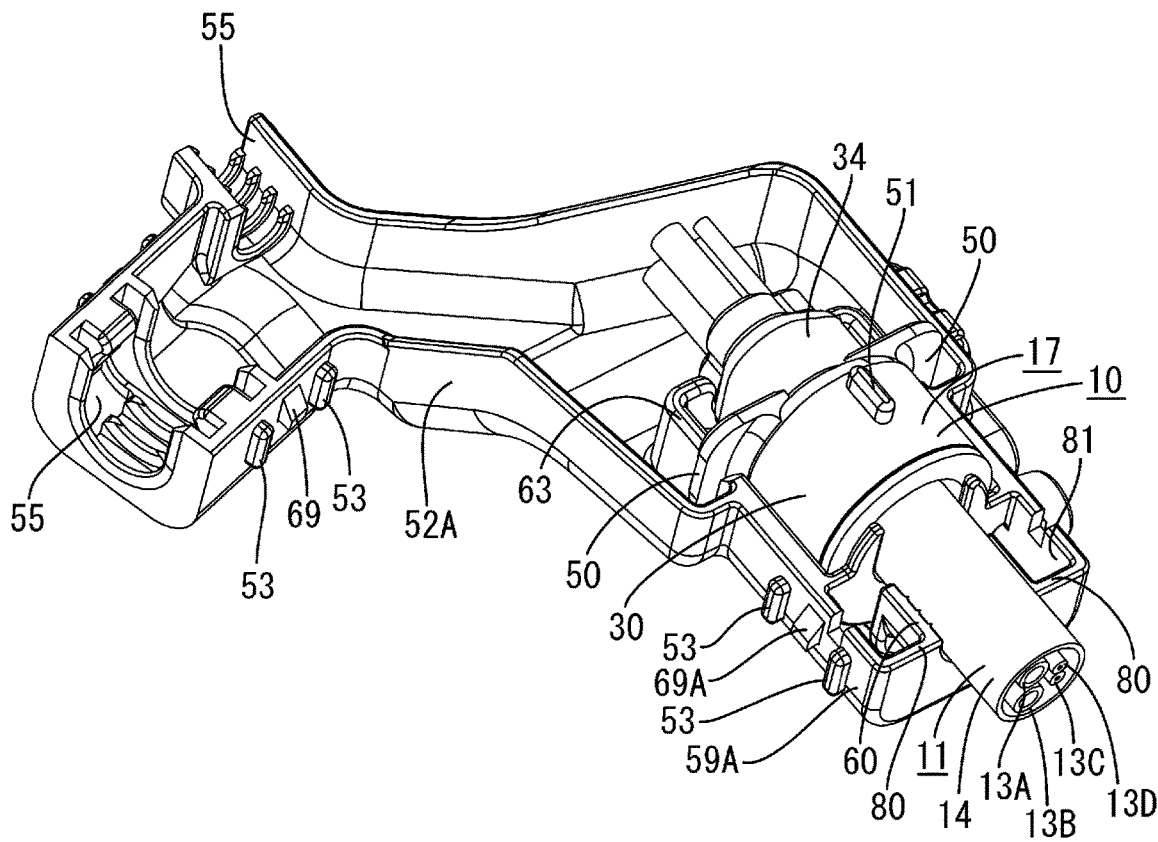
FIG. 8 is a perspective view showing a state in which the cable to which the cap was attached is placed on the first holder.

As shown in FIGS. 7 and 8, the cap 17 is provided with an anti-rotation protrusion 51 that protrudes upward, on the outer circumferential surface of the wide portion 30. The anti-rotation protrusion 51 has a rib-shape extending in the direction in which the wide portion 30 is open (in the horizontal direction in FIG. 7).

Figure 2:
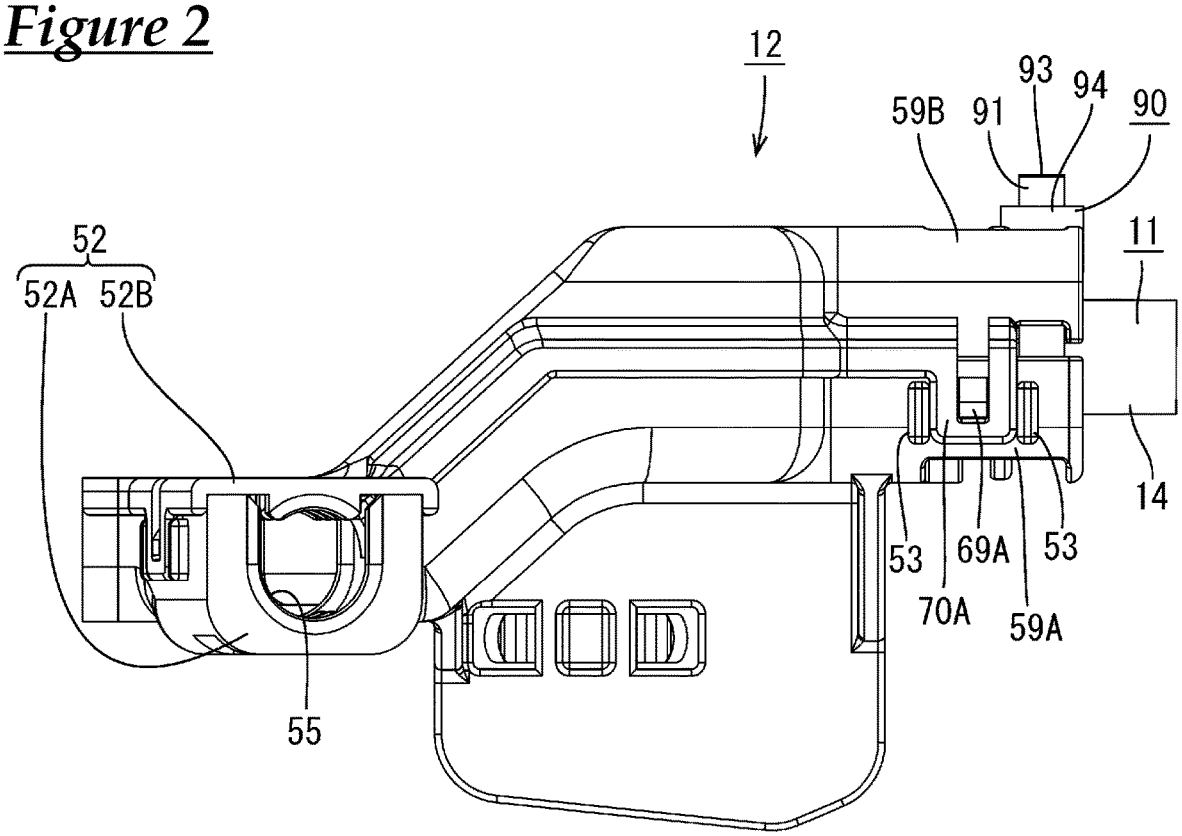
FIG. 2 is a side view showing the holding structure for a cable.

As shown in FIGS. 1 and 2, the holder 52 includes a first holder 52A and a second holder 52B that is attached to this first holder 52A.

Figure 6:
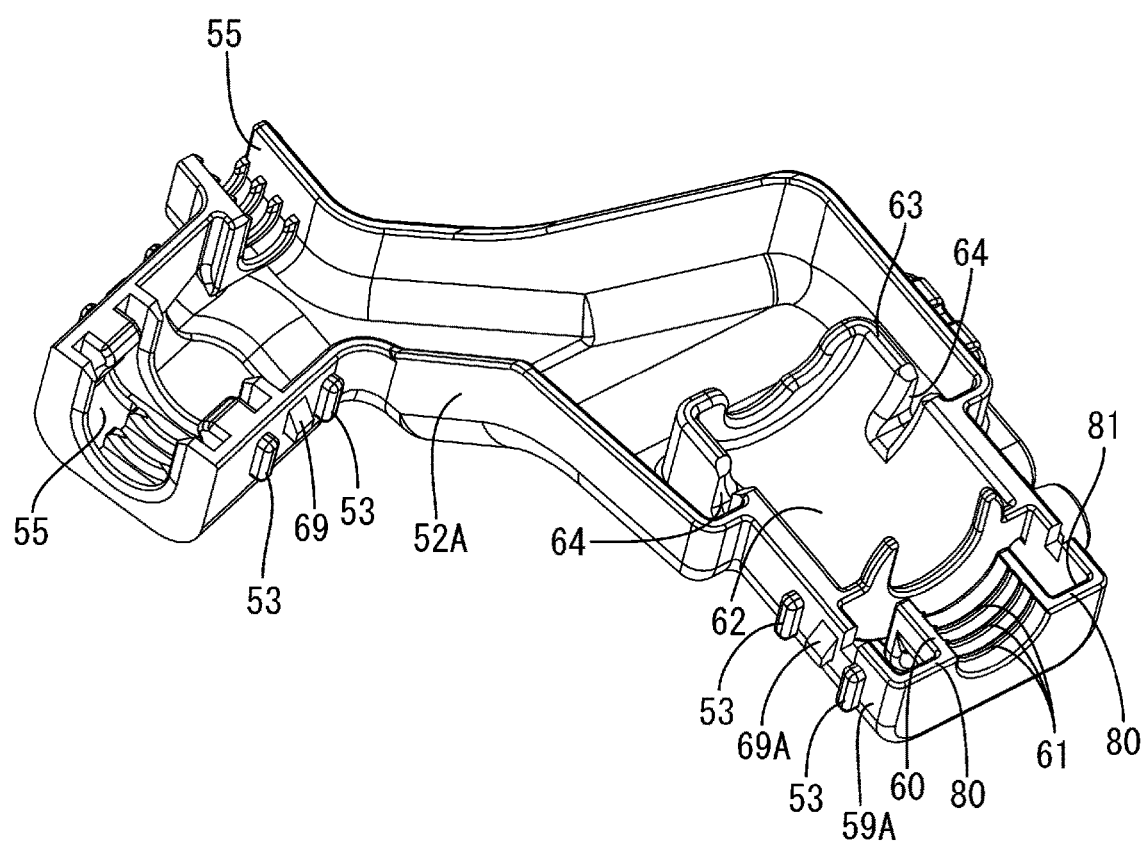
FIG. 6 is a perspective view showing a first holder.

As shown in FIG. 6, the first holder 52A includes a bottom wall and side walls that extend upward from side edges of the bottom wall. The side wall is provided with a lead-out opening 55 that is recessed semicircularly and is open, the first to fourth electrical wires 13A, 13B, 13C, and 13D extending out from the lead-out opening 55.

A first extension portion 59A that protrudes outward is formed on a side wall of the first holder 52A other than the side wall provided with the lead-out opening 55. A first clamping portion 60 configured to hold the sheath 14 of the cable 11 is formed at a position near a front end of the first extension portion 59A.

A surface of the first clamping portion 60 on which the sheath 14 is placed has an approximately semicircular shape. When a force is applied to the first clamping portion 60 from the outside in the radial direction of the first clamping portion 60, the first clamping portion 60 deforms inward in the radial direction such that the diameter of the first clamping portion 60 is reduced.

The first clamping portion 60 is provided with first holding ribs 61 that protrude inward and extend in the circumferential direction of the first clamping portion 60. A plurality (three in the present embodiment) of the first holding ribs 61 are formed spaced apart from each other in the direction in which the first extension portion 59A extends. The first holding ribs 61 are in contact with the outer circumferential surface of the sheath 14 from the bottom, and thus the first holding ribs 61 hold the sheath 14. This suppresses shifting of the relative positions of the cable 11 and the holder 52 (see FIG. 5).

As shown in FIGS. 6 to 8, a cap holding portion 62 configured to hold the cap 17 extends from a position near the side wall of the first extension portion 59A to a position of the first holder 52A that is located slightly inward of the first extension portion 59A. A partition 63 that protrudes upward from the bottom wall is formed at a position of the cap holding portion 62 that is located closer to the first holder 52A than the side wall. The narrow portion 34 of the cap 17 is accommodated in a region surrounded by the partition 63. The partition 63 is provided with engagement grooves 64 (engagement portions) into which the engagement protrusions 50 are inserted, the engagement grooves 64 extending downward from the upper end edge of the partition 63, at positions corresponding with the engagement protrusions 50 of the cap 17, in a state in which the cap 17 is accommodated in the partition 63.

The engagement protrusions 50 are inserted into the engagement grooves 64 in the state in which the cap 17 is accommodated in the partition 63. Accordingly, when the engagement protrusions 50 come into contact with the inner surfaces of the engagement grooves 64 in the thickness direction of the engagement protrusions 50, shifting of the relative positions of the cap 17 and the holder 52 is suppressed.

The engagement grooves 64 are formed at positions of the partition 63 that are located slightly inward of the side walls of the first holder 52A. Accordingly, a force that is applied to the cap 17 is received by the side walls of the first holder 52A.

The width of the lock grooves 64 is set to be equal to, or slightly larger than the thickness of the engagement protrusions 50A and 50B. Opening edges of the engagement grooves 64 are provided with inclined surfaces for guiding the engagement protrusions 50A and 50B, the length of the inclined surface increasing upward.

The outer wall of the first extension portion 59A is provided with locking portions 69A. The end portion of the first extension portion 59A and the first clamping portion 60 are linked by a first linking portion 80. The first linking portion 80 extends inward from the end portion of the first extension portion 59A in the radial direction of the cable 11. The first clamping portion 60 extends in a cantilever shape inward of the first holder 52A from the inner end portion of the first linking portion 80 along the direction in which the cable 11 extends. The inner end portion of the first clamping portion 60 that is located inside the first holder 52A serves as a free end.

A first insertion space 81 for passage of the binding member 90, which will be described later, is formed between the first extension portion 59A, the first clamping portion 60, and the first linking portion 80.

The side wall of the first holder 52A is provided with a pair of protection ribs 53 extending in the vertical direction on the left and right sides of the locking portion 69. The height of the protection rib 53 protruding from the outer surface of the side wall of the first holder 52A is set to be approximately equal to the height of the locking portion 69 protruding from the outer surface of the side wall of the first holder 52A (see FIG. 7).

As shown in FIGS. 1 and 2, the second holder 52B includes an upper wall and side walls that extend downward from end edges of the upper wall. The side walls of the second holder 52B are provided with a plurality of locking reception portions 70 at positions corresponding with the plurality of locking portions 69 formed on the side walls of the first holder 52A. When the locking portions 69 and the locking reception portions 70 elastically engage with each other, the first holder 52A and the second holder 52B are attached to each other.

The side wall of the second holder 52B is provided with a second extension portion 59B at a position corresponding with the first extension portion 59A in a state in which the first holder 52A and the second holder 52B are attached to each other.

The second extension portion 59B of the second holder 52B is provided with an anti-rotation hole 71, passing through the second extension portion 59B of the second holder 52B at a position corresponding with the anti-rotation protrusion 51 of the cap 17 in a state in which the cap 17 is accommodated in the cap holding portion 62. As shown in FIG. 5, the anti-rotation protrusion 51 is inserted into the anti-rotation hole 71 and the anti-rotation protrusion 51 comes into contact with the inner circumferential surface of the anti-rotation hole 71, and thereby, rotation of the cap 17 in the cap holding portion 62 in the circumferential direction of the wide portion 30 of the cap 17 is suppressed.

Figure 3:
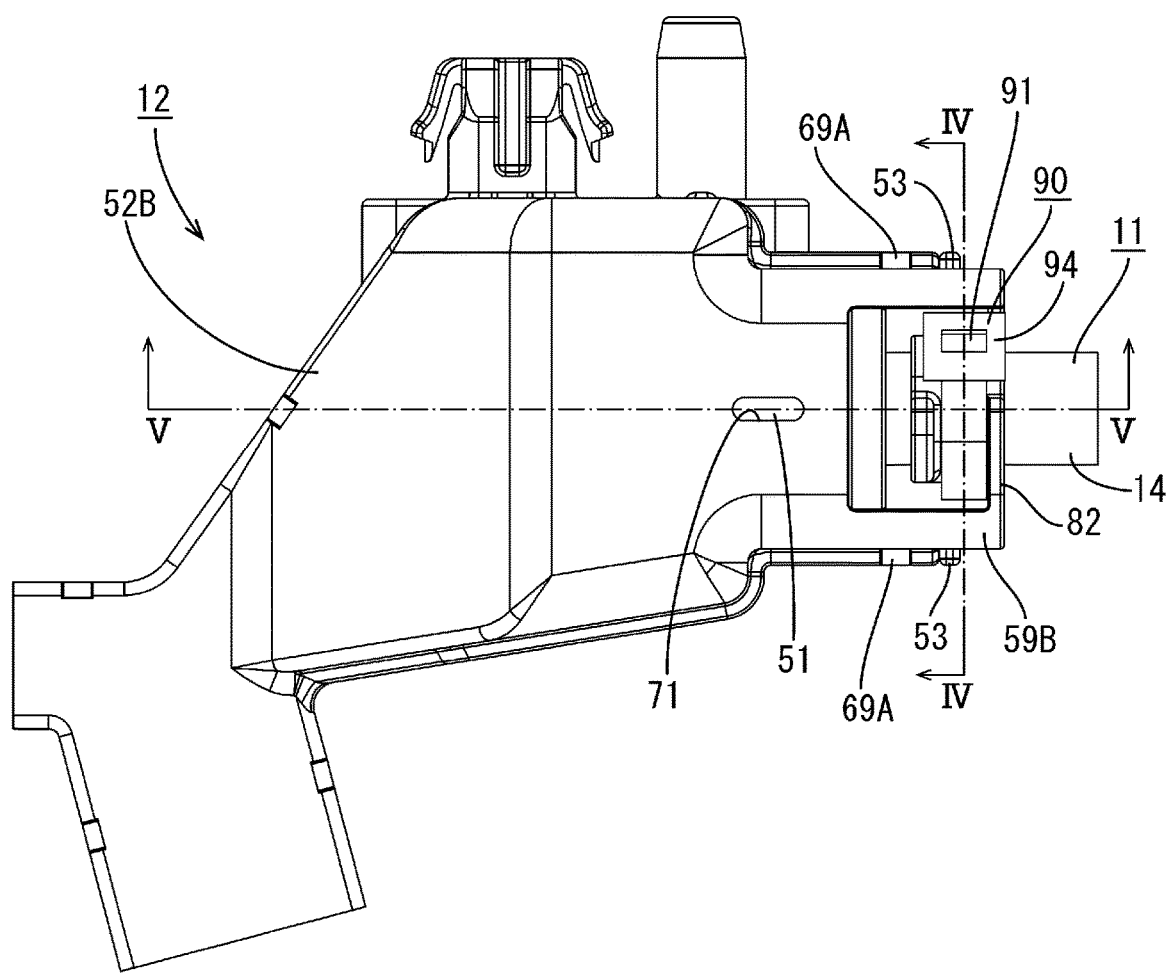
FIG. 3 is a plan view showing the holding structure for a cable.

As shown in FIG. 3, the second clamping portion 65 is formed at a position located near the front end portion of the second extension portion 59B, the second clamping portion 65 clamping the sheath 14 of the cable 11 placed on the first clamping portion 60 between the first clamping portion 60 and the second clamping portion 65.

A surface of the second clamping portion 65 that is in contact with the sheath 14 has an approximately semicircular shape. When a force is applied to the second clamping portion 65 from the outside in the radial direction of the second clamping portion 65, the second clamping portion 65 deforms inward in the radial direction such that the diameter of the second clamping portion 65 is reduced.

The second clamping portion 65 is provided with second holding ribs 66 that protrude inward and extend in the circumferential direction of the second clamping portion 65. A plurality (three in the present embodiment) of the second holding ribs 66 are formed spaced apart from each other in the direction in which the second extension portion 59B extends. The second holding ribs 66 are in contact with the outer circumferential surface of the sheath 14 from the top, and thus the second holding ribs 66 hold the sheath 14. This suppresses shifting of the relative positions of the cable 11 and the holder 52 (see FIG. 5).

As shown in FIGS. 1 and 2, the outer wall of the second extension portion 59B is provided with a locking reception portion 70A. The end portion of the second extension portion 59B and the second second clamping portion 65 are linked by a second linking portion 82. The second linking portion 82 extends inward from the end portion of the second extension portion 59B in the radial direction of the cable 11. The second clamping portion 65 extends in a cantilever shape inward of the second holder 52B from the inner end portion of the second linking portion 82 along the direction in which the cable 11 extends. The inner end portion of the second clamping portion 65 that is located inside the second holder 52B serves as a free end.

As shown in FIG. 3, a second insertion space 83 for passage of a binding member 90, which will be described later, is formed between the second extension portion 59B, the first clamping portion 60, and the second linking portion 82.

In a state in which the locking portion 69 of the first holder 52A and the locking reception portion 70 of the second holder 52B are engaged with each other, the height of the protection rib 53 protruding from the outer surface of the side wall of the first holder 52A is set to be approximately equal to the height of the locking reception portion 70 protruding from the outer surface of the side wall of the first holder 52A.

Figure 4:
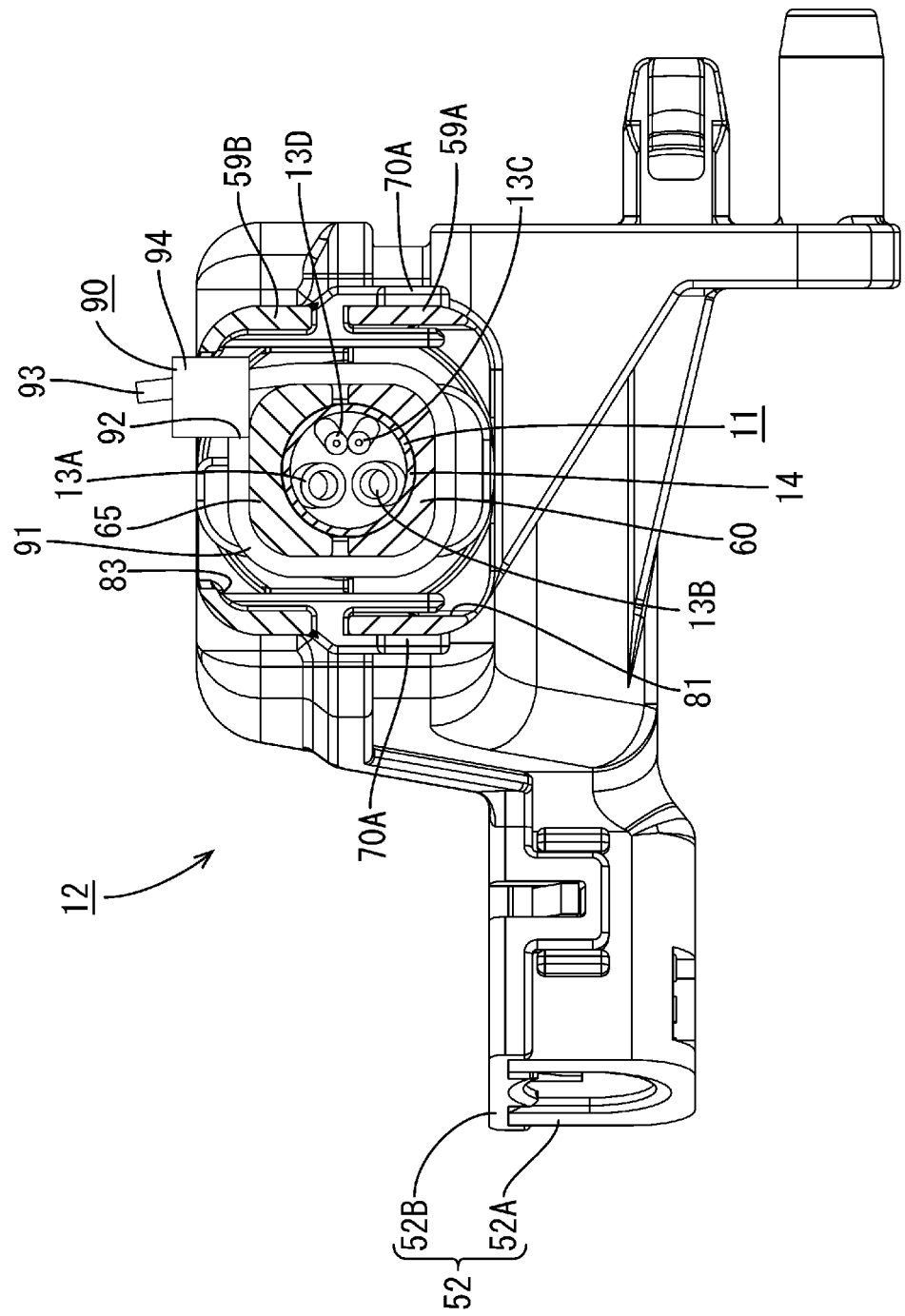
FIG. 4 is a cross-sectional view taken along line IV-IV in FIG. 3.

As shown in FIGS. 4 and 5, in a state in which the first holder 52A and the second holder 52B are attached to each other, the sheath 14 of the cable 11 placed on the first clamping portion 60 is clamped between the first clamping portion 60 and the second clamping portion 65. The binding member 90 that has passed through the first insertion space 81 and the second insertion space 83 is wrapped around the first clamping portion 60 and the second clamping portion 65. The first clamping portion 60 and the second clamping portion 65 are pressed inward in the radial direction by this binding member 90. Accordingly, the inner circumferential surface of the sheath 14 and the outer surfaces of the first to fourth electrical wires 13A, 13B, 13C, and 13D are in intimate contact with each other. As a result, the sheath 14 and the first to fourth electrical wires 13A, 13B, 13C, and 13D are positioned.

Figure 9:
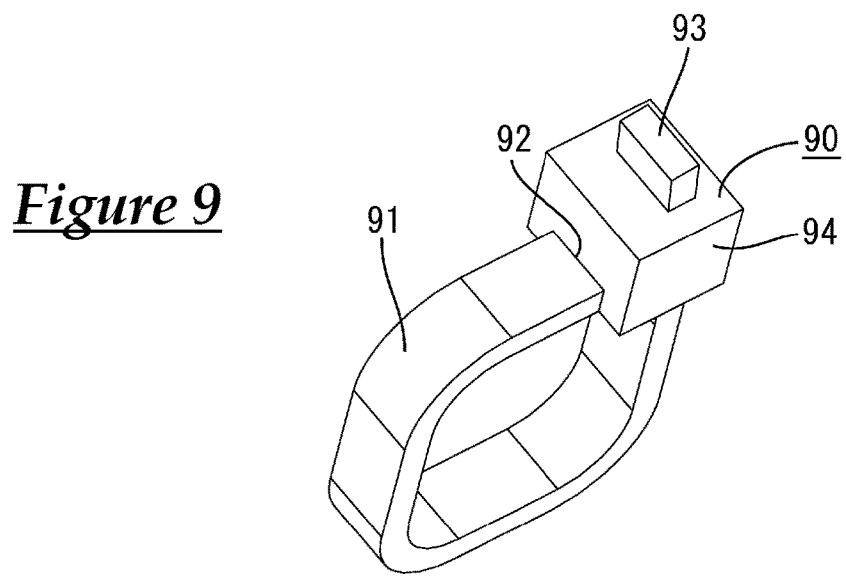
FIG. 9 is a perspective view showing a binding member.
Figure 10:
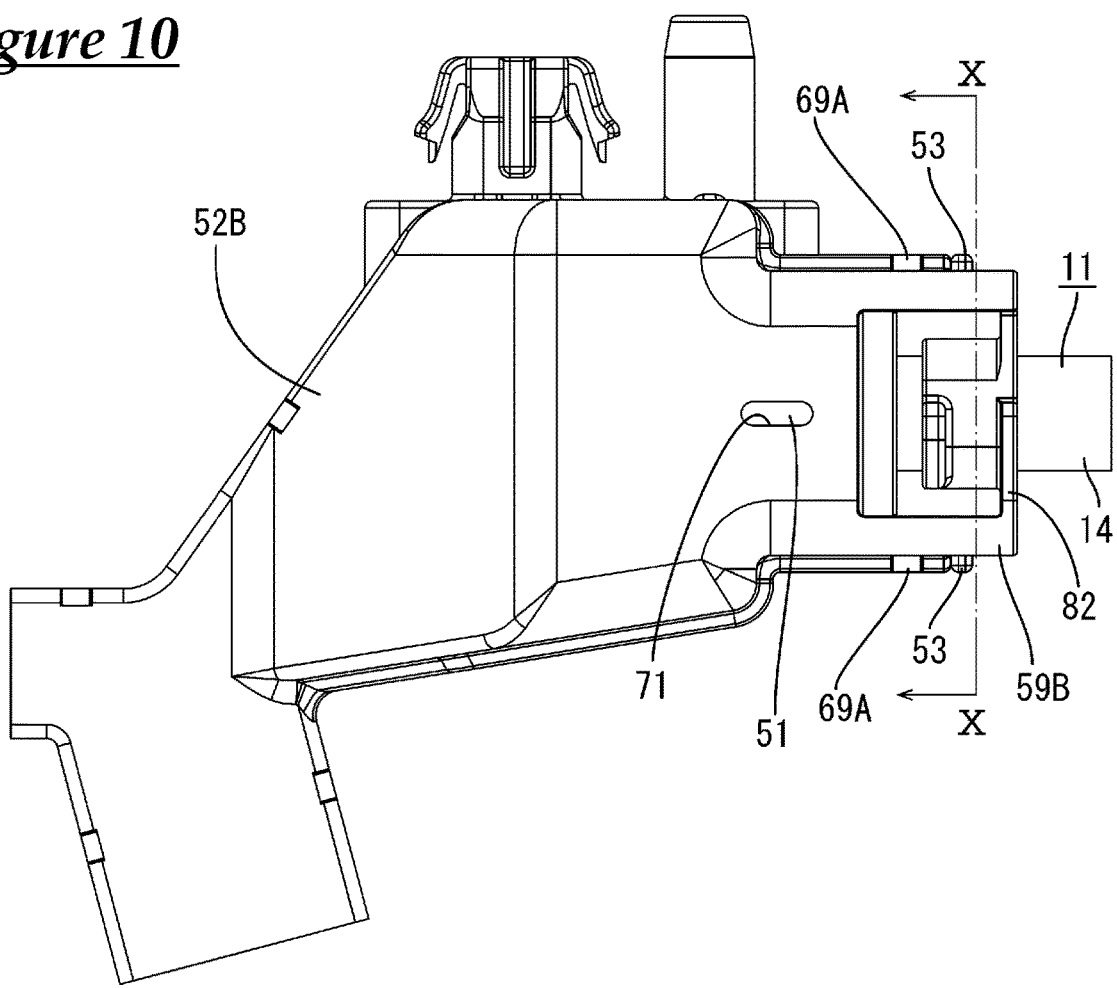
FIG. 10 is a plan view showing a state in which a second holder is attached to the first holder after the cable to which the cap was attached is placed on the first holder.

As shown in FIG. 9, the binding member 90 includes a band portion 91 having a belt shape, and a retaining portion 94 that is attached to one end portion 92 of the band portion 92 and is configured to retain the other end portion 93 of the band portion 91 in a direction opposite to the direction in which the band portion 91 has passed through the retaining portion 94, in a state in which the other end portion 93 of the band portion 91 passes through the retaining portion 94. The binding member 90 may also be made of a synthetic resin or metal, and any material can be selected as appropriate as necessary. Also, a known structure can be selected as the binding member 90 as appropriate.

Although not shown in detail, the retaining portion 94 has an insertion hole for passage of the band portion 91. The inner surface of the insertion hole is provided with an engagement reception portion (not shown) configured to engage with an engagement portion (not shown) formed in the band portion 91. When the engagement portion of the band portion 91 engages with the engagement reception portion of the retaining portion 94, the other end portion 93 of the band portion 91 is retained in the direction opposite to the direction in which the band portion 91 passes through the retaining portion 94.

Effects of Embodiment

Next, one example of a manufacturing process in the present embodiment will be described, and the effects of the present embodiment will be described. Note that the manufacturing process in the present embodiment is not limited to the following description.

First, the sheath 14 of the cable 11 is stripped using a known method. Accordingly, the first to fourth electrical wires 13A, 13B, 13C, and 13D extend out from the end portion 14A of the sheath 14.

Next, the first to fourth electrical wires 13A, 13B, 13C, and 13D are respectively inserted into the through-holes 22 of the rubber plug 15. Thereafter, the rubber plug 15 is moved to the end portion 14A of the sheath 14, and the sheath fitting portion 18 of the rubber plug 15 is fitted around the end portion 14A of the sheath 14.

Next, the first to fourth electrical wires 13A, 13B, 13C, and 13D are respectively inserted into the lead-out holes 37 of the cap 17. Thereafter, the cap 17 is moved to the position of the rubber plug 15 that was fitted around the end portion 14A of the sheath 14, and the cap 17 is fitted around the rubber plug 15. The cap 17 is then pushed until the cap 17 comes into contact with the flange portion 19 of the rubber plug 15.

Next, as shown in FIGS. 7 and 8, the sheath 14 of the cable 11 is placed on the first clamping portion 60 of the first holder 52A, and the cap 17 is placed on the cap holding portion 62 such that the anti-rotation protrusion 51 of the cap 17 is oriented upward. At this time, the engagement protrusions 50 of the cap 17 are inserted into the engagement grooves 64 from the above.

Next, the second holder 52B is attached to the first holder 52A from the above. At this time, the locking portions 69 and the locking reception portions 70 elastically engage with each other, and thereby, the second holder 52B and the first holder 52A are assembled integrally.

Figure 11:
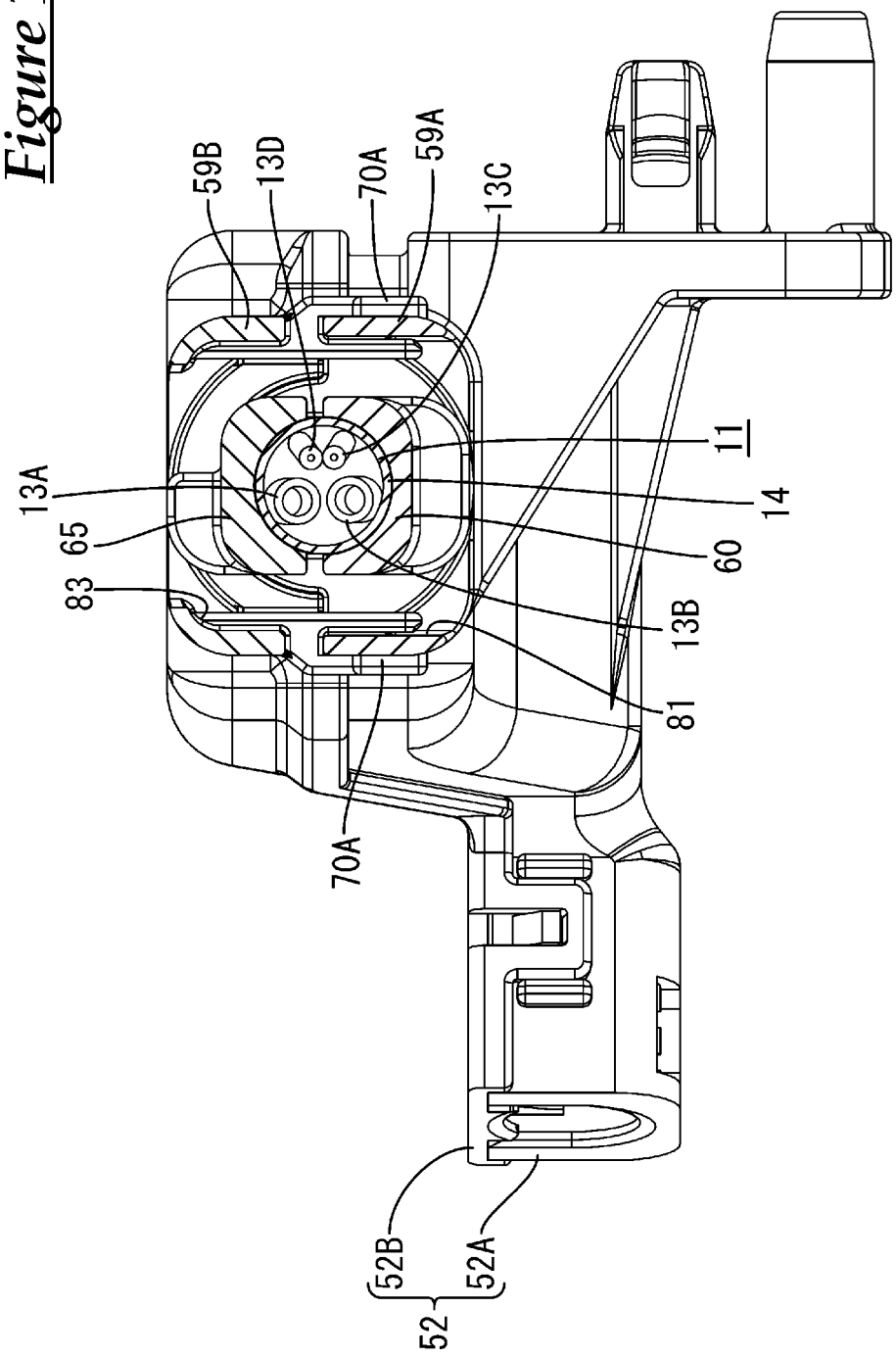
FIG. 11 is a cross-sectional view taken along line X-X in FIG. 10.

As shown in FIG. 11, when the locking portions 69A of the first extension portion 59A and the locking reception portions 70A of the second extension portion 59B engage with each other, the first extension portion 59A and the second extension portion 59B receive a force in a direction in which the first extension portion 59A and the second extension portion 59B approach each other. In other words, the first extension portion 59A receives a force upward in FIG. 11. On the other hand, the second extension portion 59B receives a force downward in FIG. 11.

The force applied to the first extension portion 59A is transmitted to the first clamping portion 60 via the first linking portion 80. Accordingly, the first clamping portion 60 receives a force upward in FIG. 11. On the other hand, the force applied to the second extension portion 59B is transmitted to the second clamping portion 65 via the second linking portion 82. Accordingly, the second clamping portion 65 receives a force downward in FIG. 11. Accordingly, a force by which the cable 11 is clamped in the vertical direction in FIG. 11 is applied to the cable 11. Accordingly, the inner circumferential surface of the sheath 14 and the outer surfaces of the first to fourth electrical wires 13A, 13B, 13C, and 13D come into intimate contact with each other, and thereby, movement of the sheath 14 and the first to fourth electrical wires 13A, 13B, 13C, and 13D in the direction in which the cable 11 extends (horizontal direction in FIG. 10) is suppressed.

At this time, the first clamping portion 60 extends in a cantilever shape from the first linking portion 80, and the second clamping portion 65 extends in a cantilever shape from the second linking portion 82. Thus, when the sheath 14 is clamped between the first clamping portion 60 and the second clamping portion 65, the free end of the first clamping portion 60 and the free end of the second clamping portion 65 tend to rise outward in the radial direction of the cable 11 due to a repulsive force applied from the sheath 14.

Next, the other end portion 93 of the band portion 91 is bent in a loop shape while the other end portion 93 is brought to pass through the second insertion space 83 and the first insertion space 81, and thereby, the band portion 91 is wrapped around the first clamping portion 60 and the second clamping portion 65. After the other end portion 93 of the band portion 91 has passed through the retaining portion 94, the other end portion 93 of the band portion 91 is pulled. Then, the band portion 91 having a loop shape is squeezed and has a smaller diameter, and accordingly, a force for reducing the diameter of the first clamping portion 60 is applied thereto and a force for reducing the diameter of the second clamping portion 65 is applied thereto. Moreover, a force for reducing the diameter of the sheath 14 inward in the radial direction of the sheath 14 is applied to the sheath 14 clamped between the first clamping portion 60 and the second clamping portion 65.

Also, the diameters of the free end of the first clamping portion 60 and the free end of the second clamping portion 65 that have risen from the sheath 14 can be reliably reduced inward in the radial direction of the sheath 14. At this time, the first clamping portion 60 is capable of further strongly supporting and holding the sheath 14 due to the lever principle with the borderline portion to the first linking portion 80 serving as a pivot. Similarly, the second clamping portion 65 is capable of further strongly supporting and holding the sheath 14 due to the lever principle with the borderline portion with the second linking portion 82 serving as a pivot.

Accordingly, the inner circumferential surface of the sheath 14 and the outer surfaces of the first to fourth electrical wires 13A, 13B, 13C, and 13D are in intimate contact with each other, and thereby, movement of the sheath 14 and the first to fourth electrical wires 13A, 13B, 13C, and 13D in the direction in which the cable 11 extends (horizontal direction in FIG. 10) is suppressed. When the band portion 91 is retained by the retaining portion 94, the sheath 14 and the first to fourth electrical wires 13A, 13B, 13C, and 13D are kept fixed. This completes a holding structure for a cable 11 (see FIG. 1).

The holding structure 12 for the cable 11 according to the present disclosure includes the cable 11 in which the first to fourth electrical wires 13A, 13B, 13C, and 13D are enveloped by the sheath 14, the first to fourth electrical wires 13A, 13B, 13C, and 13D extending out from an end portion of the sheath 14, the first holder 52A provided with the first clamping portion 60 configured to clamp the cable 11 between the first clamping portion 60 and a second clamping portion 65, the second holder 52B provided with the second clamping portion 65 configured to clamp the cable 11 between the first clamping portion 60 and the second clamping portion 65 in a state in which the second holder 52B is attached to the first holder 52A, the rubber plug 15 held by the first holder 52A and the second holder 52B, the rubber plug 15 having the plurality of through-holes 22 through which the first to fourth electrical wires 13A, 13B, 13C, and 13D respectively are passed, in a state in which the rubber plug 15 is fitted around the end portion of the sheath 14, and the binding member 90 wrapped around the first clamping portion 60 and the second clamping portion 65 in the state in which the cable 11 is clamped between the first clamping portion 60 and the second clamping portion 65.

According to the above-described configuration, when the cable 11 is clamped between the first clamping portion 60 and the second clamping portion 65, a force is applied to the cable 11 in a direction in which the sheath 14 is clamped, from the first clamping portion 60 and the second clamping portion 65. Accordingly, the inner circumferential surface of the sheath 14 and the outer surfaces of the first to fourth electrical wires 13A, 13B, 13C, and 13D come into intimate contact with each other, and thus shifting of the positions of the sheath 14 and the first to fourth electrical wires 13A, 13B, 13C, and 13D can be suppressed.

Next, in the state in which the cable 11 is clamped between the first clamping portion 60 and the second clamping portion 65, the first clamping portion 60 and the second clamping portion 65 receive a force in a direction in which their diameters are reduced, from the binding member 90 wrapped around the first clamping portion 60 and the second clamping portion 65. Accordingly, a force is applied to the sheath 14 in a direction in which the diameter of the sheath 14 is reduced inward in the radial direction of the sheath 14. As a result, the inner circumferential surface of the sheath 14 and the outer surfaces of the first to fourth electrical wires 13A, 13B, 13C, and 13D come into intimate contact with each other, and thus the sheath 14 and the first to fourth electrical wires 13A, 13B, 13C, and 13D are reliably fixed.

As a result of the above, shifting of the positions of the sheath 14 and the first to fourth electrical wires 13A, 13B, 13C, and 13D is suppressed, and thus shifting of the positions of the plurality of through-holes 22 formed through the rubber plug 15 and the first to fourth electrical wires 13A, 13B, 13C, and 13D is also suppressed. On the other hand, shifting of the positions of the rubber plug 15 and the sheath 14 is suppressed due to the rubber plug 15 being fitted around the end portion 14A of the sheath 14. As a result of the above, because shifting of the relative positions of the rubber plug 15, the sheath 14, and the first to fourth electrical wires 13A, 13B, 13C, and 13D is suppressed, it is possible to reliably seal the first to fourth electrical wires 13A, 13B, 13C, and 13D.

Also, according to the present embodiment, the first holder 52A has the locking portions 69A and the first linking portion 80 that links the locking portions 69A and the first clamping portion 60. Also, the second holder 52B has the locking reception portions 70A that elastically engage with the locking portions 69A at positions corresponding with the locking portions 69A, and the second linking portion 82 that links the locking reception portions 70A and the second clamping portion 65.

According to the above-described configuration, when the locking portions 69A and the locking reception portions 70A elastically engage with each other, a force is applied thereto in a direction in which the locking portions 69A and the locking reception portions 70A approach each other. This force is transmitted from the locking portions 69A to the first clamping portion 60 via the first linking portion 80, and is transmitted from the locking reception portions 70A to the second clamping portion 65 via the second linking portion 82. Accordingly, it is possible to reliably clamp the cable 11 clamped between the first clamping portion 60 and the second clamping portion 65, and thus to reliably suppress shifting of the positions of the sheath 14 and the first to fourth electrical wires 13A, 13B, 13C, and 13D.

Also, according to the present embodiment, the first clamping portion 60 extends in a cantilever shape from the end portion of the first linking portion 80 along the cable 11, and the second clamping portion 65 extends in a cantilever shape from the end portion of the second linking portion 82 along the cable 11.

According to the above-described configuration, when the sheath 14 is clamped from the outside between the first clamping portion 60 and the second clamping portion 65, the free end of the first clamping portion 60 and the free end of the second clamping portion 65 tend to rise outward in the radial direction of the cable 11 due to a repulsive force applied from the sheath 14. The diameters of the free end of the first clamping portion 60 and the free end of the second clamping portion 65 can be reliably reduced inward in the radial direction of the sheath 14 by fastening, with the binding member 90, the portions that have risen from the sheath 14 in this state. At this time, the first clamping portion 60 is capable of further strongly supporting and holding the sheath 14 due to the lever principle with the borderline portion to the first linking portion 80 serving as a pivot. Similarly, the second clamping portion 65 is capable of further strongly supporting and holding the sheath 14 due to the lever principle with the borderline portion with the second linking portion 82 serving as a pivot.

Also, according to the present embodiment, the holding structure for the cable 11 includes the cap 17 configured to press the rubber plug 15 inward in a state in which the cap 17 is fitted around the rubber plug 15, in which the cap 17 is provided with the engagement protrusions 50 configured to engage with the engagement grooves 64 formed in the first holder 52A in a state in which the cable 11 is clamped between the first clamping portion 60 and the second clamping portion 65.

According to the present embodiment, the sheath 14 is held by the first clamping portion 60 and the second clamping portion 65, and the cap 17 is held by the engagement grooves 64 and the engagement protrusions 50. Accordingly, the relative positions of the sheath 14 and the cap 17 can be reliably held. Accordingly, the rubber plug 15 is reliably pressed against the sheath 14 and the first to fourth electrical wires 13A, 13B, 13C, and 13D by the cap 17. As a result, it is possible to reliably seal the portions at which the first to fourth electrical wires 13A, 13B, 13C, and 13D branch in the cable 11.

Other Embodiments

The present invention is not merely limited to the embodiments described above using the foregoing description and drawings, and embodiments such as the following are also encompassed in the technical scope of the present invention.

Although in the present embodiment, a configuration was adopted in which the first holder 52A and the second holder 52B are integrally assembled due to elastic engagement between the locking portions 69 and the locking reception portions 70, the present invention is not limited to this, and the first holder 52A and the second holder 52B may also be fixed by bolts and nuts, the first holder 52A and the second holder 52B may also be fixed using a winding member such as a metal belt with which the first holder 52A and the second holder 52B are wound, or the first holder 52A and the second holder 52B may also be bonded together, and the first holder 52A and the second holder 52B can be attached using any method as necessary.

The number of electrical wires arranged in the cable 11 may also be one, two, three, five or more.

Although the plurality of electrical wires are configured to include two types of electrical wires having different outer diameters, the present invention is not limited to this, and a configuration is also possible in which the electrical wires include three or more types of electrical wires having different outer diameter.

The outer diameters of the plurality of electrical wires may also be the same.

The electrical wires may also be shielded electrical wires. Also, the electrical wires may also be stranded wires that include a core wire obtained by twisting a plurality of metal strands, or may be so-called single-core wires in which the core wire is a metal rod member. In this way, any electrical wires can be appropriately selected as necessary as the electrical wire.

The cable 11 may also be a multicore shielded wire in which a plurality of electrical wires are enveloped by a shielding layer, and any cable can be appropriately selected as necessary as the cable 11.

Although the first holder 52A and the second holder 52B are separate components in the present embodiment, the present invention is not limited to this, and a configuration is also possible in which the first holder 52A and the second holder 52B are integrally formed via a hinge.

Although a configuration was adopted in which the first holder 52A is provided with the protection ribs 53 in the present embodiment, the present invention is not limited to this, and a configuration is also possible in which the second holder 52B is provided with the protection ribs 53.

A configuration is also possible in which the first holder 52A is provided with a locking reception portion, and the second holder 52B is provided with a locking portion.

Although a configuration was adopted in which the engagement grooves 64 are provided in the first holder 52A in the present embodiment, the present invention is not limited to this, and an engagement groove may also be provided in the second holder 52B, or engagement grooves may also be provided in both the first holder 52A and the second holder 52B.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

11 Cable
12 Holding structure
13A First electrical wire
13B Second electrical wire
13C Third electrical wire
13D Fourth electrical wire
14 Sheath
14A End portion of sheath
15 Rubber plug
17 Cap
22 Through-hole
50A, 50B Engagement protrusion (engagement reception portion)
52A First holder
52B Second holder
60 First clamping portion
64 Engagement groove (engagement portion)
65 Second clamping portion
69, 69A Locking portion
70, 70A Locking reception portion 80 First linking portion
82 Second linking portion
90 Binding member

The invention claimed is:

1. A holding structure for a cable, comprising:
a cable in which a plurality of electrical wires are enveloped by a sheath, the plurality of electrical wires extending out from an end portion of the sheath;
a first holder provided with a first clamping portion configured to clamp the cable between the first clamping portion and a second clamping portion;
a second holder provided with the second clamping portion configured to clamp the cable between the first clamping portion and the second clamping portion in a state in which the second holder is attached to the first holder;
a rubber plug that has a plurality of through-holes through which the plurality of electrical wires respectively are passed, and that is held by the first holder and the second holder, in a state in which the rubber plug is fitted around the end portion of the sheath; and
a binding member that is wrapped around the first clamping portion and the second clamping portion in a state in which the cable is clamped between the first clamping portion and the second clamping portion.

2. The holding structure for a cable according to claim 1, wherein one of the first holder and the second holder is provided with a locking portion, the other of the first holder and the second holder is provided with a locking reception portion configured to elastically engage with the locking portion,
the first holder has a first linking portion configured to link the first clamping portion and one of the locking portion and the locking reception portion, and
the second holder has a second linking portion configured to link the second clamping portion and the other of the locking portion and the locking reception portion.

3. The holding structure for a cable according to claim 2, wherein the first clamping portion extends in a cantilever shape from an end portion of the first linking portion along the cable, and
the second clamping portion extends in a cantilever shape from an end portion of the second linking portion along the cable.

4. The holding structure for a cable according to claim 1, comprising:
a cap configured to press the rubber plug inward in a state in which the cap is fitted around the rubber plug,
wherein the cap is provided with an engagement reception portion configured to engage with an engagement portion that is formed in both or one of the first holder and the second holder in a state in which the cable is clamped between the first clamping portion and the second clamping portion.

* * * * *